United States Patent [19]

Brown

[11] 4,179,254

[45] Dec. 18, 1979

[54] INJECTION MOLD WITH FLOATING STRIPPER RING

[75] Inventor: Paul Brown, Orangeville, Canada

[73] Assignee: Husky Injection Molding Systems Inc., Bolton, Canada

[21] Appl. No.: 945,901

[22] Filed: Sep. 26, 1978

[51] Int. Cl.² .............................. B29C 7/00; B29F 3/00
[52] U.S. Cl. .......................................... 425/438; 249/68
[58] Field of Search ..................... 249/66, 67, 68, 205, 249/63, 64; 425/388

[56] References Cited

U.S. PATENT DOCUMENTS

| | | | |
|---|---|---|---|
| 2,272,718 | 2/1942 | MacLogan et al. | 249/67 |
| 2,850,766 | 9/1958 | Press et al. | 249/68 X |
| 3,482,814 | 12/1969 | Hedgewick | 249/67 |
| 3,534,443 | 10/1970 | Tucker | 249/68 X |
| 3,718,419 | 2/1973 | Adamo | 425/438 |
| 4,019,711 | 4/1977 | Altenhof et al. | 425/DIG. 5 |
| 4,125,246 | 11/1978 | von Holdt | 249/68 X |

Primary Examiner—J. Howard Flint, Jr.
Attorney, Agent, or Firm—Karl F. Ross

[57] ABSTRACT

An injection mold with a female mold portion and a male mold portion has a locking ring with beveled inner centering surfaces which, in a mold-closed position, embrace respective outer centering surfaces of the two mold portions for holding them precisely aligned for molding a thin-walled cup between a tapered core of the male portion and a cavity wall of the female portion. The core is surrounded by a stripper ring which rests on an internal shoulder of the locking ring concentric therewith and is entrainable with the latter by a stripper plate when the mold is opened. The two concentric rings may be interconnected by screws, by a snap ring, or by radially extending pins lodged in coplanar bores of the locking ring and engaging in a peripheral groove of the stripper ring, these pins having flattened faces or eccentric ends held in contact with one of the groove walls by mounting bolts which traverse the channels and secure the locking ring to the stripper plate.

11 Claims, 11 Drawing Figures

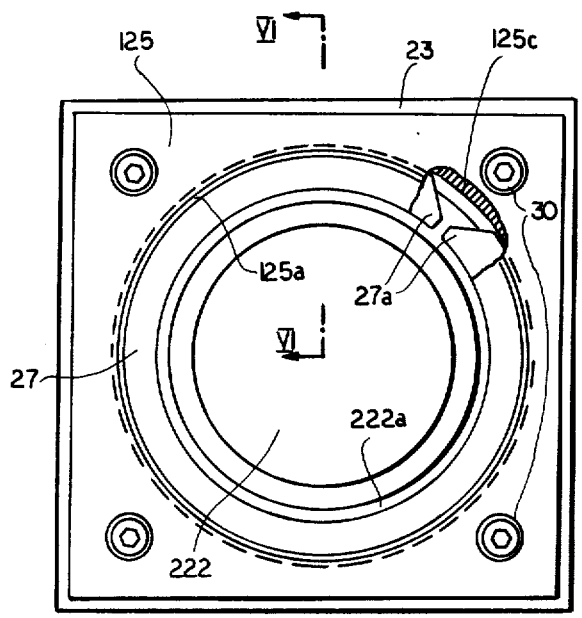
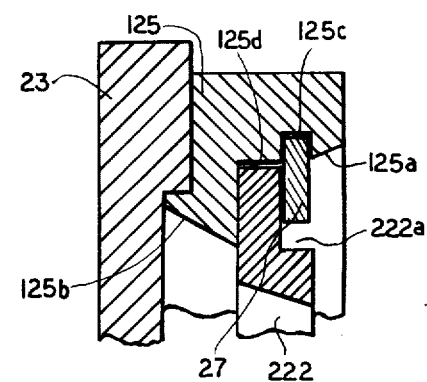
FIG. 5
FIG. 6
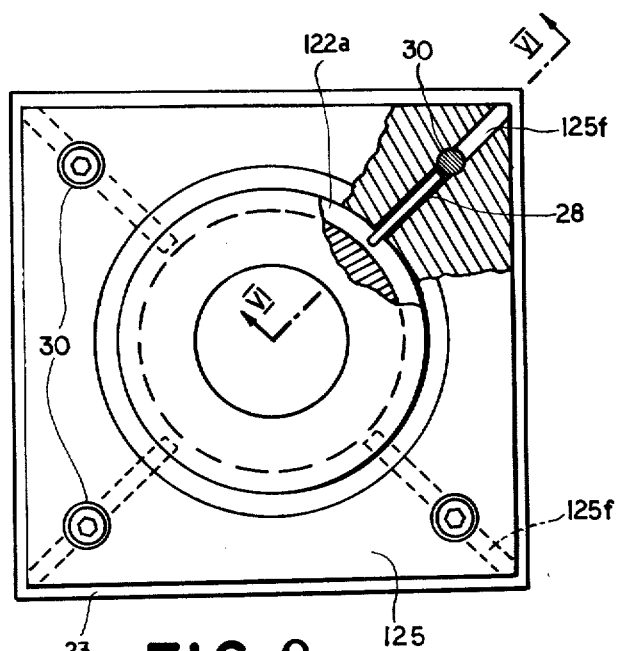
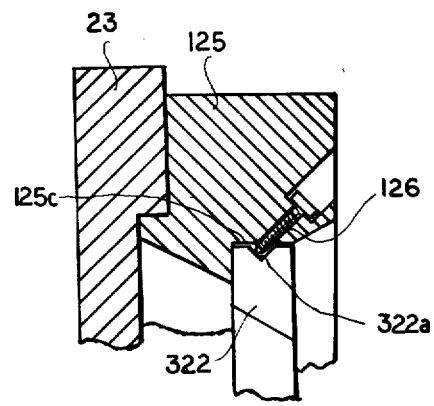
FIG. 7
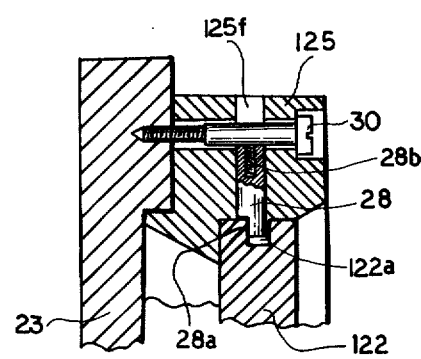
FIG. 8
FIG. 9
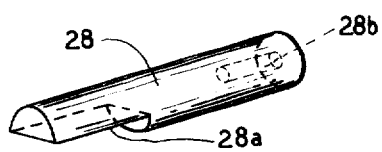
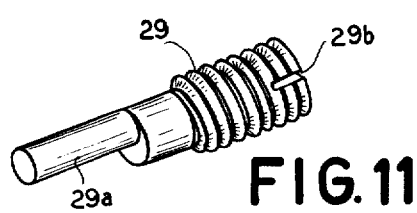
FIG. 10
FIG. 11

INJECTION MOLD WITH FLOATING STRIPPER RING

FIELD OF THE INVENTION

My present invention relates to a mold for an injection-molding machine having male and female mold parts carried on two relatively movable platens and interconnected by tie bars, a stripper ring being used for dislodging a molded article from a core forming part of the male mold portion.

BACKGROUND OF THE INVENTION

Especially for the molding of thin-walled cups and similar articles, it is essential to insure an exact alignment of the core with a coacting cavity in the female mold portion. If the core is lightly tapered, the molded article adheres to it when the mold is opened and will therefore have to be stripped off by a ring closely hugging that core. Such a stripper ring, carried on a stripper plate extending radially beyond the mold, can also be used as a means for relatively centering the core and the cavity; injection molds have, in fact, been so constructed in the past.

This use of a stripper ring for centering purposes, however, subjects that ring to considerable wear which impairs its usefulness. If, instead, a locking ring of larger diameter is utilized for alignment purposes, the stripper ring is no longer radially accessible in the mold-closed position and must therefore be actuated by rods traversing both the male mold portion and the platen carrying that portion. Such a mounting is cumbersome and complicates the replacement of that mold portion by another.

OBJECTS OF THE INVENTION

The general object of my present invention, accordingly, is to provide an improved assembly of a mold, a stripper ring and a locking ring which obviates the aforestated drawbacks.

A more specific object is to provide means in such an assembly for accurately centering a removable stripper ring with reference to the associated core.

SUMMARY OF THE INVENTION

In accordance with my present invention, a locking ring having inner centering surfaces engageable with respective outer centering surfaces of the associated mold portions is secured to a stripper plate which is slidably supported between the platens on their tie bars, either directly or through the intermediary of one of these platens, for movement parallel to the tie bars in a mold-open position. The stripper ring is seated in the locking ring between the centering surfaces thereof so as to be entrainable by the stripper plate together with the locking ring.

According to a more particular feature of my invention, the locking ring has a shoulder on the side of the stripper ring facing the platen which supports the male mold portion (referred to hereinafter as the movable platen), the stripper ring being removably held against that shoulder by fastening means which may take a variety of forms as more fully described hereinafter. In a particularly advantageous embodiment, the fastening means comprises a set of outwardly retractable pins lodged in generally radial channels of the locking ring and maintained in an operative position by backstop means traversing these channels, preferably by mounting bolts securing the locking ring to the stripper plate.

BRIEF DESCRIPTION OF THE DRAWING

The above and other features of my invention will now be described in detail with reference to the accompanying drawing in which:

FIG. 5 is a face view of an assembly of stripper plate, locking ring and stripper ring used in the mold of FIGS. 3 and 4;

FIG. 6 is a fragmentary cross-sectional view taken on the line VI—VI of FIG. 5;

FIG. 7 is a view similar to FIG. 6, illustrating a modification;

FIG. 8 is a view similar to FIG. 5, showing another modified assembly;

FIG. 9 is a fragmentary cross-sectional view taken on the line IX—IX of FIG. 8;

FIG. 10 is a perspective view of a retaining pin for the assembly of FIGS. 8 and 9; and FIG. 11 is a view similar to FIG. 10, showing a modified retaining pin.

SPECIFIC DESCRIPTION

Figure 1:
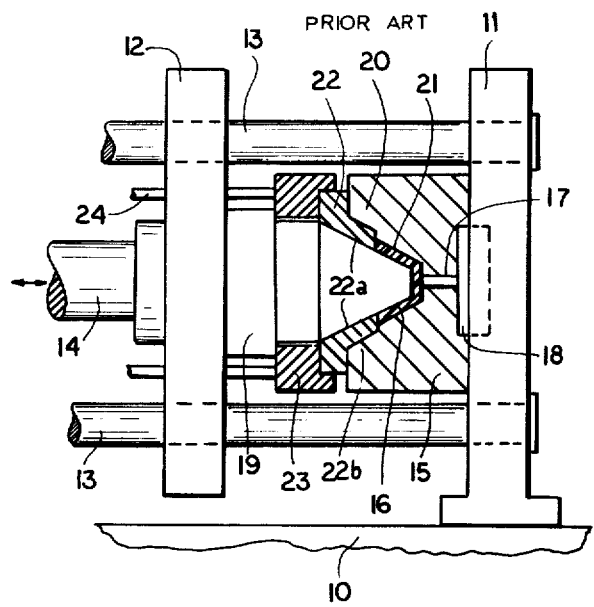
FIGS. 1 and 2 are axial sectional views of prior-art molds on an injection-molding machine to which my invention is applicable.

In FIG. 1 I have shown part of a conventional injection-molding machine comprising a bed 10, a stationary platen 11 and a movable platen 12, the latter being reciprocable on a set of tie bars 13 by a ram 14 forming part of a mold drive not further illustrated. Platen 11 supports a female mold portion 15 with a cavity 16 to which liquefied plastic material is fed via an orifice 17 from an injection unit indicated only schematically at 18. A male mold portion 18 mounted on movable platen 12 has a frustoconical core 20 which enters the cavity 16, in the illustrated mold-closed position, with small all-around clearance for the molding of a thin-walled cup 21. A stripper ring 22 with a tapering inner peripheral surface 22a, conforming to that of core 20, is mounted on a stripper plate 23 which in turn is supported on tie bars 13 through the intermediary of platen 12 and actuating rods 24 traversing that platen. The rods 24 form part of a mechanism, not further illustrated, for axially shifting the stripper plate 23 with its ring 22 after the mold has been opened, in order to dislodge the molded article 21 from the core 20. Reference may be made in this connection, for example, to commonly owned U.S. Pat. No. 3,807,915.

Stripper ring 22 has a frustoconical outer peripheral surface 22b which, in the illustrated mold-closed position, engages a complementary inner peripheral surface of mold portion 15 to center the latter with reference to core 20 and mold portion 19. This centering action results, on account of unavoidable manufacturing tolerances, in uneven wear of ring surfaces 22a and 22b, eventually leading to a certain disalignment of the axis of core 20 from that of cavity 16 so that the molded article 21 no longer will have uniform wall thickness. This requires frequent replacement of worn stripper rings and increases the costs of production.

Figure 2:
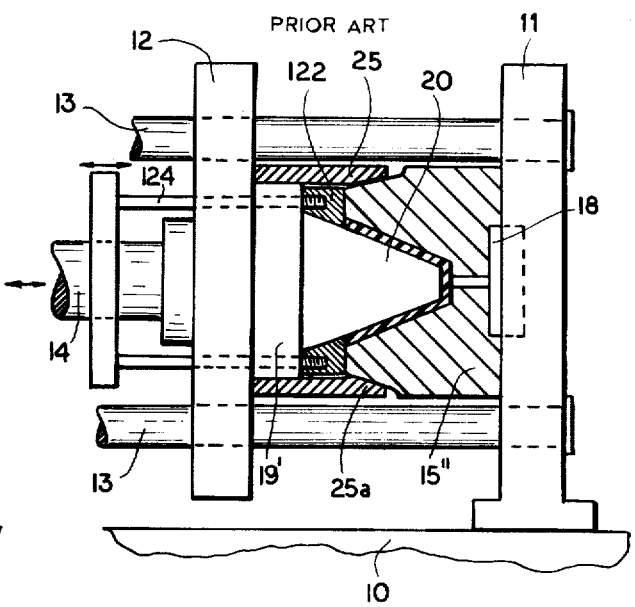

In another conventional system, illustrated in FIG. 2, the task of centering modified mold portions 15' and 19' has been relegated to a locking ring 25 with a tapering inner peripheral surface 25a engaging the mold portion 15' in the illustrated closure position. Locking ring 25 surrounds the base of core 20 and embraces a modified stripper ring 122 which therefore cannot be supported by a stripper plate as shown in FIG. 1. Ring 122, accordingly, must be actuated by a mechanism comprising a plurality of connecting rods 124 which pass through the movable platen 12 as well as through the base of mold portion 19'; that mechanism may be of the type shown in commonly owned U.S. Pat. No. 3,726,625. When mold portion 19' is to be replaced, rods 124 must be disconnected from ring 122 while locking ring 25 is separately detached from platen 12 with which it has been connected by nonillustrated screws.

Figure 3:
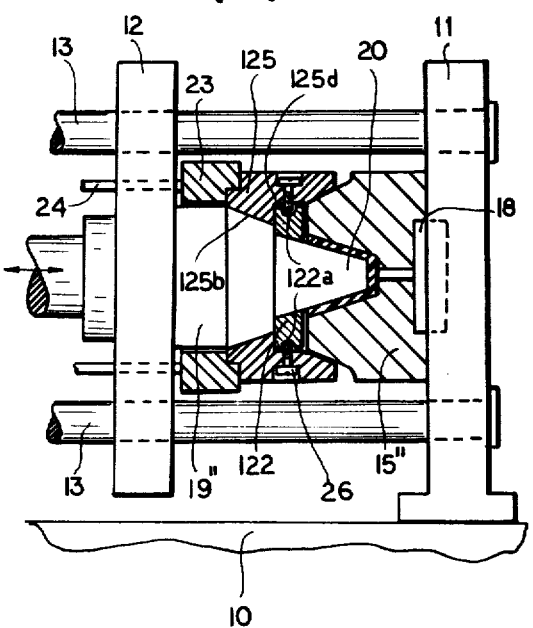
FIGS. 3 and 4 are views generally similar to FIGS. 1 and 2 but showing my improved mold assembly in a mold-closed and a mold-open position, respectively.
Figure 4:
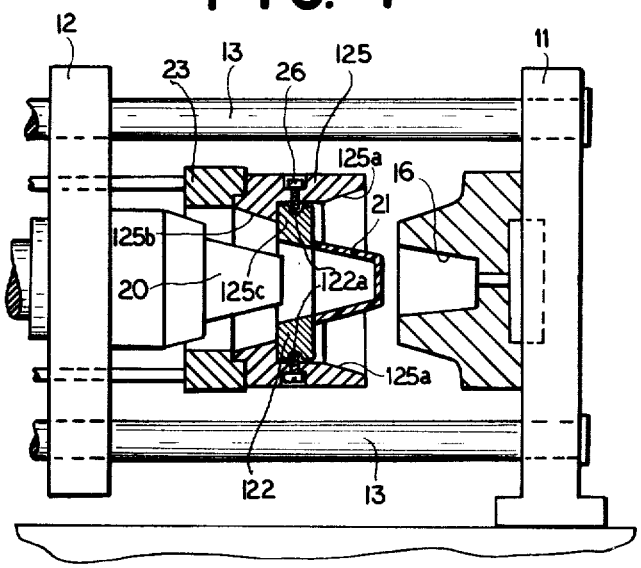

In FIGS. 3 and 4 I have shown the molding machine of FIGS. 1 and 2 with female and male mold portions 15", 19" respectively carried on platens 11 and 12, the latter platen being penetrated by actuating rods 24 supporting a stripper plate 23 similar to that shown in FIG. 1. The stripper plate, which surrounds the base of core 20 with small clearance, is secured by countersunk screws 30, shown in FIGS. 5, 8 and 9, to a locking ring 125 which in turn forms a seat for a stripper ring 122 with cylindrical outer surface similar to that of FIG. 2. Locking ring has two oppositely tapered inner centering surfaces 125a and 125b which in the mold-closed position of FIG. 3 engage complementary outer centering surfaces of mold portions 15" and 19", respectively. Centering surface 125b terminates in a transverse annular shoulder 125c onto which the stripper ring 122 is held by fastening means represented in FIGS. 3 and 4 by a plurality of screws 26 which are threaded into respective radial bores of the locking ring and engage in a peripheral groove 122a of the stripper ring. A cylindrical inner annular surface 125d of locking ring 125 extends between shoulder 125c and centering surface 125a, that cylindrical surface having a diameter slightly larger than that of the grooved outer periphery of ring 122.

In operation, closure of the mold (FIG. 3) firmly clamps the locking ring 125 between the two mold portions 15" and 19" but may leave a small space between platen 12 and stripper plate 23 as well as between stripper ring 122 and mold portion 15". Ring 122, accordingly, is not subjected to any significant stress likely to cause excessive wear. When the mold is opened (FIG. 4), the leftward motion of assembly 23, 122, 125 lags behind that of movable platen 12 so that the freshly molded article 21 is ejected from the core 20 and drops between the two mold portions onto a conveyor or into a receptacle not shown.

The utilization of radial screws 26 for fastening the stripper ring 122 to the locking ring 125 provides only line contact between the tips of these screws and the left-hand wall of groove 122a so that, especially after prolonged use, the two rings may not be exactly concentric. While any such eccentricity will have no effect upon the relative alignment of core 20 and cavity 16, it may cause the stripper ring to bear unevenly upon the rim of the freshly molded cup 21 with a possible deformation of the latter. Another way of releasably interconnecting the two rings, providing a more secure fit, has been illustrated in FIGS. 5 and 6 where a stripper ring 222 has a shallow annular recess 222a on its exposed face, that recess accommodating a split ring 27 which snaps into a peripheral groove 125e on the cylindrical surface 125d of locking ring 125. The confronting ends 27a of split ring 27 are cut at a slant so as to be engageable, in the mold-open position, by a tool such as a screwdriver for extraction from the groove 125e whenever it is desired to remove the ring 222 from its seat in ring 125.

In FIG. 7 I have shown a stripper ring 322 which differs from ring 122 of FIGS. 3 and 4 by having a triangular-section peripheral groove 322a with orthogonally adjoining walls. A set of fastening screws 126, only one of which has been illustrated, are threaded into bores of locking ring 125 inclined at an angle of 45° to the ring axis so as to bear endwise upon the left-hand groove wall closer to shoulder 125c. Any wear of either the tip or the groove may therefore be compensated by an extra twist imparted to the screws 126.

FIGS. 8 and 9 illustrate a particularly advantageous embodiment avoiding any risk of untimely removal of the stripper ring from its seat. The locking ring 125, which has a square outer periphery as also shown in FIG. 5, is formed in this instance at its four corners with diagonally extending channels 125f accommodating respective cylindrical pins 28 whose tips engage in the peripheral groove 122a of a stripper ring 122 similar to that shown in FIGS. 3 and 4. The free ends of pins 28 (see also FIG. 10) are flattened at 28a so as to make area contact with the left-hand wall of groove 122a as seen in FIG. 9. The pins are backstopped in this engagement position by the mounting screws 30 which traverse the channels 125f and which, as noted above, serve to secure the locking ring 125 to the stripper plate 23. To facilitate the retraction of any pin 28 from its channel 125f, the outer end of each pin has a blind bore 28b which is threaded and thus engageable by a screw inserted for this purpose from without. If the groove-engaging face 28a of any pin shows excessive wear, that pin may readily be replaced.

FIG. 11 illustrates a somewhat similar pin 29, designed as a grub screw, which could be used with the assembly of FIGS. 8 and 9 if the channels 125f were threaded to mate with its threads. The inwardly directed end of pin 29 has an eccentric cylindrical projection 29a which, upon insertion, makes line contact with the wall of ring groove 122a proximal to stripper plate 23. The eccentricity of projection 29a allows a certain compensation for wear by a rotation of pin 29 about its axis, its outer end being provided for this purpose with a slot 29b. The pins may be maintained in their adjustment position by the insertion of shims of suitable thickness between their slotted ends and the associated mounting bolts 30.

It will thus be seen that I have provided a removable mold accessory which, while fulfilling the dual function of centering the associated mold portions and ejecting a molded article, does not subject the ejection element (i.e. the stripper ring) to excessive wear and can therefore effectively operate for long periods, requiring at most an occasional replacement of minor parts such as the pins 28 of FIGS. 8–10.

I claim:

1. In an injection-molding machine provided with two relatively movable platens interconnected by tie bars, a male mold portion on one of said platens, a female mold portion on the other of said platens having a cavity enterable in a mold-closed position by a core projecting from said male mold portion, and a stripper ring surrounding said core for dislodging a molded article therefrom in a mold-open position, the combination therewith of:

a stripper plate supported on said tie bars between said platens for movement parallel to said tie bars in said mold-open position; and a locking ring provided with inner centering surfaces engaging respective outer centering surfaces of said mold portions in said mold-closed position for maintaining said mold portions in mutual alignment, said stripper ring being seated in said locking ring between said inner centering surfaces thereof, said locking ring being mounted on said stripper plate for entrainment thereby in said mold-open position.

2. The combination defined in claim 1 wherein said locking ring has a shoulder on the side of said stripper ring facing said one of said platens, further comprising fastening means on said locking ring for removably holding said stripper ring against said shoulder.

3. The combination defined in claim 2 wherein said shoulder adjoins one of said inner centering surfaces and is separated from the other of said inner centering surfaces by a cylindrical inner surface surrounding said stripper ring.

4. The combination defined in claim 1, 2 or 3 wherein said inner and centering surfaces are oppositely tapered.

5. The combination defined in claim 2 wherein said fastening means comprises a snap ring on said stripper ring engaging in a peripheral groove of said locking ring.

6. The combination defined in claim 2 wherein said fastening means comprises a set of screws threaded from without into said locking ring and provided with tips received in a peripheral groove of said stripper ring.

7. The combination defined in claim 6 wherein said peripheral groove has a triangular cross-section with two orthogonally adjoining walls, said screws bearing perpendicularly upon one of said walls.

8. The combination defined in claim 2 wherein said locking ring is provided with a plurality of generally radial channels open onto said stripper ring, said fastening means comprising a set of outwardly retractable pins in said channels with inner ends received in a peripheral groove of said stripper ring, and backstop means removably traversing said channels adjacent the outer ends of said pins for preventing their retraction.

9. The combination defined in claim 8 wherein said backstop means comprises a set of mounting bolts securing said locking ring to said stripper plate.

10. The combination defined in claim 8 or 9 wherein said pins are provided at their inner ends with flattened faces confronting said shoulder and resting against a wall of said groove.

11. The combination defined in claim 8 or 9 wherein said inner ends are eccentric projections.

* * * * *